July 14, 1970   J. L. LILLY   3,520,223

QUICK RELEASE DEVICE WITH AUTOMATIC RESET

Filed Sept. 3, 1968

INVENTOR:
JAMES L. LILLY,
BY William G. Becker
AGENT

United States Patent Office 3,520,223
Patented July 14, 1970

3,520,223
QUICK RELEASE DEVICE WITH AUTOMATIC RESET
James L. Lilly, Wayne, Pa., assignor to General Electric Company, a corporation of New York
Filed Sept. 3, 1968, Ser. No. 757,008
Int. Cl. F16b 21/10
U.S. Cl. 85—7                8 Claims

ABSTRACT OF THE DISCLOSURE

A quick release fluid actuated fastening device adaptable to be reset quickly and without the need of reassembly.

BACKGROUND OF THE INVENTION

The subject invention generally relates to fastening devices and, in particular, to reuseable quick release type fastening devices.

In many areas, particularly those relating to aircraft and space vehicles, a need exists for a quick release fastening device. Some prior art devices use frangible members to retain the device in the fastened position until an actuating force is applied which breaks them. Other quick release fastening devices have been developed using one or more elements to hold the device in the fastened position until, by an actuating force, they are thrown clear of the device to effect the quick release. However, in all of these devices it is rather time consuming and cumbersome to reset or recock the fastening device. Generally it is also difficult to accurately test the device prior to actual use to provide assurance of proper release because the release element itself may be destroyed by the testing procedure.

SUMMARY OF THE INVENTION

Accordingly, an object of the subject invention is to provide a quick release device which is easily reset.

A further object of the present invention is to provide a quick release device which provides a thrust action on the fastener.

Yet another object of the present invention is to provide a quick release device with a visual indication of the position of the device, i.e. locked or released.

In order to fulfill the above-stated objects, the present invention provides a quick release device, particularly suitable for use in connection with a bolt-type fastener, which utilizes a plurality of collet segments to effect the locking of the device. The quick release device consists primarily of a substantially hollow cylindrical casing surrounding an outer substantially cylindrical locking piston; a spring biasing the collet segments toward the fastener; an inner plurality of collet segments for engaging a portion of the bolt fastener; a thrust piston coaxial with the collet segments and within the locking piston, and a coaxial spring biasing the thrust piston away from the upper end of the locking piston. The bolt fastener is cut away a short distance from its engagement end so as to form a substantially mushroom-shaped end portion to provide engagement with the quick-release device. With the device in the engaged position, a portion of the end of the bolt engages a mating land on the collet segments to provide a rigid engagement of the bolt thereto and a portion of the locking piston engages the collet segments to lock them in place. When the bolt is to be released, fluid is ducted to a cavity within the casing thereby translating the locking piston out of contact with the collet segments. The thrust piston is then forced downwardly so as to cam the collet segments outwardly thereby releasing the bolt. Also, the thrust piston serves to lock the collet segments in the released position and propel the bolt downwardly after engagement therewith. Inspection ports are provided in the wall of the casing and possibly the wall of the locking piston so that when the release device is in the released position, an indication thereof is visible through the ports.

The subject matter which I regard as my invention is particularly pointed out and distinctly claimed in the concluding portion of this specification.

BRIEF DESCRIPTION OF THE DRAWINGS

My invention, however, together with further objects and advantages thereof, may best be understood by reference to the following description taken in conjunction with the accompanying drawings in which.

DESCRIPTION OF THE PREFERRED EMBODIMENT

Figure 1:
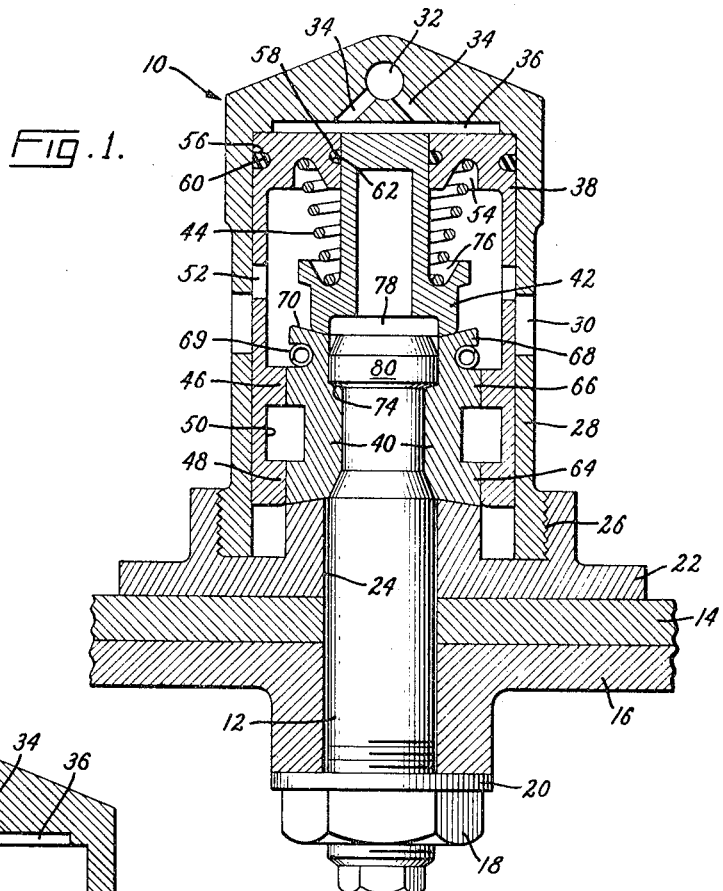
FIG. 1 is a side view, partially in section, of a quick release device, in accordance with the subject invention, in the engaged position.
Figure 2:
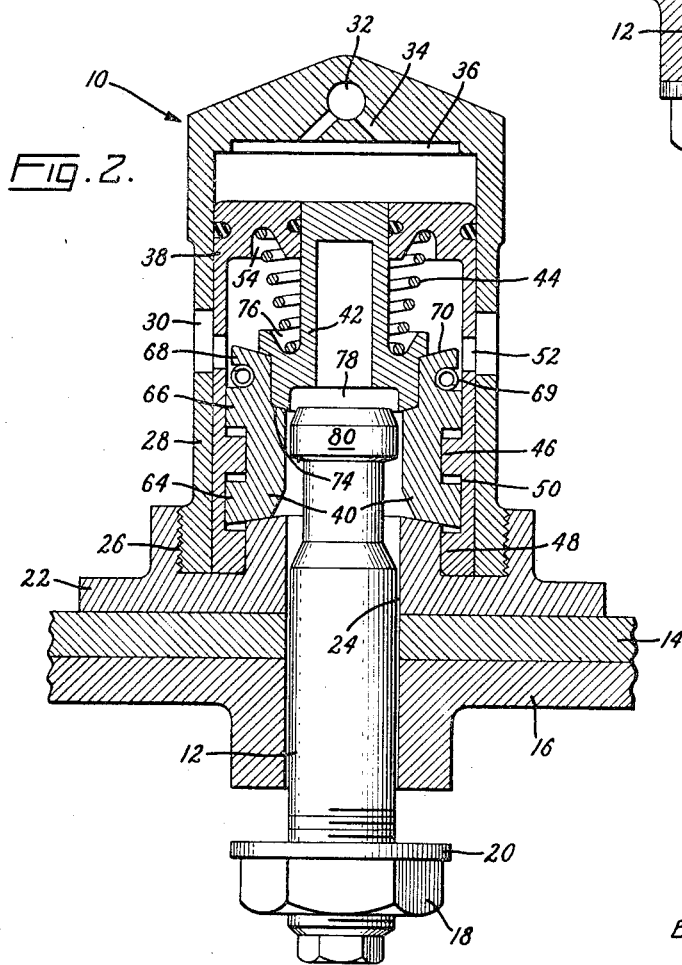
FIG. 2 is a side view, partially in section, of the device shown in FIG. 1 in the released position.

In FIGS. 1 and 2 a quick release device 10 in accordance with the subject invention is shown. For purposes of illustration, the release device 10 is shown for use with a bolt fastener 12 for joining two plates 14, 16 together.

The lower end of bolt 12 is threaded so that a conventional nut 18 and washer 20 may bear against plate 16, the extreme end of bolt 12 being shaped polygonally so that bolt 12 and nut 18 may be held by wrenches on the same side of plate 16, in order to tighten nut 18. The other end of bolt 12 is rounded or mushroom-shaped at 80 to facilitate its insertion between movable collets in the fastening device, and is turned down behind the rounded end 80 to form a shoulder which the collet may engage after the bolt is inserted between them.

The casing of the device 10 itself is comprised of a base 22 having a bore 24 through which the bolt 12 may extend and a substantially hollow cylindrical shell 28 which is threadedly attached to the base 22. Coaxial with the bore 24 is a ring-shaped groove 26 having internal female threads which mate with a lower male threaded portion of the cylindrical shell 28 to provide engagement therewith. The shell 28 has a plurality of inspection holes 30 circumferentially located about a portion of the side wall thereof which are used to provide a visible indication of the device position, i.e. locked or released. Fluid, which is used to actuate the release mechanism of the device, is communicated to the interior of the device via a fluid inlet port 32 and passageways 34 in the shell 28 which terminate at a small cavity 36 at the upper end of the hollow portion of the shell 28.

Within the hollow portion of the shell 28, a plurality of coaxial elements are located which effect the actual locking and release functions. These elements include an outer locking piston 38, a plurality of annularly arranged collet segments 40, a thrust piston 42 and a helical spring 44 extending between a portion of the thrust piston 42 and a portion of the locking piston 38.

Located in the side wall of the locking piston 38 are a plurality of circumferentially spaced inspection ports 52 which are aligned with the inspection holes 30 of the shell 28 to provide a visual indication of the device position, i.e. locked or released. A downwardly facing annular groove 54 is located in the upper portion of locking piston 38 within which one end of the spring 44 is located to allow the spring to act between the locking piston and thrust piston 42. Also, in the upper portion of the locking piston 38, two small annular grooves 56, 58 are located on the innner and outer circumference thereof, respectively, with O-ing seals 60, 62 located therein to provide a fluid tight seal, for a purpose which will be subsequently described. The locking piston 38 further includes two integral annular rings 46, 48 inwardly facing and located on a lower portion of the locking piston 38 which engage portions of the collet segments 40 which in turn lock the bolt 12 in place when the device is in the locked condition. The annular rings 46, 48 are spaced a short distance apart so as to form an annular groove 50 therebetween within which portions of collet segments 40 extend when the device is in the released position, at which time the locking piston will have been translated to a different position.

The portion of the collet segments 40 which engage the annular rings 46, 48 of the locking piston 38 are two outwardly facing ring portions 64, 66 at the top portion of the collet segments 40. An upper ring portion 68 is located so as to be visible through the inspection holes 30 and inspection ports 52 when the device 10 is in the released position.

In order to return the collet segments to a position wherein they may engage and lock the bolt 12 in place, a garter spring 69 is disposed in a groove between ring portions 66, 68 to bias the collet segments 40 inwardly toward the bolt 12. The upper, inward portion of the collet segments 40 is cut away so as to form a land 74 for engaging the bolt 12.

Above the collet segments 40 is located the thrust piston 42 which acts on the collet segments 40 to effect release of the bolt 12 therefrom. Cam action between the lower, downwardly sloping face of the thrust piston and the mating upper face 70 of the collet segments 40 causes the collet segments to move radially outward, thereby releasing the bolt 12. Also included in the thrust piston 42 is an upwardly facing annular groove 76 for engaging one end of the spring 44 extending between it and the locking piston 38. As it may be desirable to have the thrust piston 42 contact the bolt 12 in order to force it out of the locking device, a downwardly facing depression 78 is located on the lower portion of the thrust piston which is sized so as to accommodate the upper end of the bolt 12.

In operation, with the device in the engaged (locked) position, the bolt 12 is in its upwardmost position with the lower lip of the mushroom-shaped end portion 80 engaging the land 74 of the collet segments to prevent vertically downward travel of the bolt. The collet segments are biased to this position by means of the garter spring 69. Alignment of the rings 64, 66 of the collet segments with the locking rings 46, 48 of the locking piston 38 provides engagement therebetween to lock the collet segments 40 in place. The upper faces of the locking piston 38 and the thrust piston 42 are substantially coplanar and form the lower wall of the cavity 36 with the O-rings 60, 62 providing a fluid tight seal. By positioning the helical spring 44 between the locking piston 38 and the thrust piston 42 the thrust piston is biased downwardly, acting in turn on the collet segments to force the ring portions of the collet segments against the corresponding ring portions of the locking piston to help lock the collet segments in place.

When release is desired, high pressure fluid from a suitable source (not shown), such as a gas generator or fluid pump, is ducted to the inlet port 32 from which it enters the cavity 36 by means of the passageways 34. The high pressure fluid acts on the upper face of the locking piston 38 and forces it downwardly until it stops. Then the high pressure fluid acts on the thrust piston 42 pushing it downwardly with the additional help of the helical spring 44, thereby forcing the collet segments 40 outwardly so that the lower ring portion 64 thereof moves substantially radially outward into the groove 50 of the locking piston 38. As the thrust piston 42 moves downwardly, the bottom surface of the depression 78 contacts the top of the end portion 80 of the bolt, thereby forcing the bolt downward. The lower portion of the thrust piston 42 then moves within the inner cutaway portion of the collet segments so as to lock the collet segments in their radially outward, released position. The helical spring 44 keeps the thrust piston in this position until reset. This released position is shown in FIG. 2.

When the release device is in the released position, the upper ring 68 of the collet segments is located radially inward of the inspection ports 52 and the inspection holes 30 so as to be visible therethrough to provide a visible indication that the device is in the released position. Alternatively, other suitable indexing means to provide a visual indication of either the engaged or released position may be used. Conveniently this could include some indicia on the locking piston 38 which is aligned with the inspection holes 30 only when the device is in the engaged or released position. The O-ring seals 60, 62 serve to retain the high pressure fluid in the cavity 36 during the release operation.

After the release operation, the high pressure fluid is disconnected from the release device and the remaining high pressure fluid is thereby vented from the release device.

When there is no longer high pressure fluid within the cavity 36 the release device may be easily reset. To accomplish reset, the bolt 12 is reinserted in the device and pushed upwardly as far as it can go. This pushes the thrust piston 42 upwardly until its circumferential surface no longer is adjacent to collet segments 40. The garter spring 69 then pulls the collet segments 40 radially inward so that the land 74 of the collet segments engages the lip of the end portion 80 of the bolt 12. The locking piston 38, now free to move in a vertical direction, is forced upwardly to its uppermost position by the helical spring 44, the release device now being in the engaged position as described above and shown in FIG. 1.

The thrust piston 42 can be structured so that no thrust is imparted to the bolt when the release device is released. Alternatively it can be designed so that the bolt is either forced only a short distance downward or is completely expelled from the locking device and the plates to be fastened by appropriately sizing the length of stroke and area of the thrust piston 42 within the device. Either the depth of the depression 78 and/or the area of the end portion 80 in contact with fluid pressure can be suitably adjusted. The greater the distance that the thrust piston contacts the bolt during the release operation, and/or the greater the thrust piston area, the greater the impulse that will be imparted to the bolt.

Also this particular embodiment allows the bolt to be held and torqued from the threaded end to permit blind hole fastening and torquing.

Thus, the subject invention provides a quick release device for a fastener which on release allows no metallic or other structural debris or gaseous by-products to be expelled and which can be quickly and reliably reset without disassembly and reassembly of the device.

It is fully intended that many modifications may be made to the disclosed quick release device which do not depart from the scope of this invention. Accordingly, the scope of the subject invention is to be construed only in regard to the appended claims.

What I claim as new and desire to secure by Letters Patent is:

1. A quick release, resettable device for a fastener joining at least two members comprising:
   (a) a plurality of fastener engaging elements located adjacent an end portion of said fastener;
   (b) means for resiliently biasing said engaging elements toward said fastener;
   (c) a locking member for locking said engaging elements in a fastener engaging position by contact therewith;
   (d) a thrust member adjacent said engaging elements having a surface adapted to cam said engaging elements away from said fastener to effect disengagement thereof on movement of said thrust member in the direction of said engaging elements and also including a portion for locking said engaging elements in their radially outward position upon release of said fastener to facilitate reset of said device;

(e) resilient means connected between said thrust member and a portion of said locking member for biasing the aforesaid members away from each other; and (f) casing means for said device defining a fluid inlet, at least a portion of a cavity, and passageways connecting said fluid outlet to said cavity, said locking member and said thrust member each having a surface defining a portion of said cavity;

(g) wherein on application of high pressure fluid to said cavity, said locking member is translated away from contact with said engaging elements and said thrust member is forced toward said engaging elements so that the thrust member surface cams said engaging elements out of engagement with said fastener to effect release thereof.

2. A device as in claim 1 wherein said thrust member also has a surface for engaging said fastener when said thrust member cams the engaging elements out of engagement with said fastener so as to cause translation of said fastener.

3. A device as in claim 2 wherein said locking member includes an integral protruding portion directed toward said engaging elements, and said engaging elements include a portion positioned so as to be aligned with and in contact with said protruding portion of said locking member when said device is in the engaged position.

4. A device as in claim 3 wherein said means for resiliently biasing said engagement elements is a ring-shaped spring circumferentially disposed about said engaging elements.

5. A device as in claim 4 wherein said fastener is a bolt having a mushroom-shaped end portion and said engaging elements have a mating circumferential land which is engaged by the lower surface of said bolt end portion when said drive is in the engaged position.

6. A device as in claim 2 wherein said casing includes at least one inspection hole therethrough and said locking member includes indication means which is in alignment with said inspection hole when said device is in a given position so as to provide a visual indication of the position of said device.

7. A device as in claim 5 wherein said casing includes at least one inspection hole therethrough and said locking member includes indication means which is in alignment with said inspection hole only when said device is in a given position so as to provide a visual indication of the position of said device.

8. A device as in claim 6 wherein said indication means includes at least one inspection port in said locking member, and at least one of said engaging elements includes a portion which is in alignment with said inspection hole and said inspection port only when said device is in a given position.

References Cited

UNITED STATES PATENTS

| | | | |
|---|---|---|---|
| 3,053,131 | 9/1962 | Stott | 85—33 |
| 3,171,183 | 3/1965 | Johnston | 85—7 |
| 2,815,971 | 12/1957 | Guinane. | |
| 3,405,593 | 10/1968 | Krisel | 89—1.01 |

FOREIGN PATENTS

| | | |
|---|---|---|
| 779,032 | 2/1968 | Canada. |

EDWARD C. ALLEN, Primary Eaminer

U.S. Cl. X.R.

85—9, 33; 89—1